United States Patent
Vu

(10) Patent No.: US 9,970,547 B2
(45) Date of Patent: May 15, 2018

(54) ULTRA-SEAL GASKET FOR JOINING HIGH PURITY FLUID PATHWAYS

(71) Applicant: VistadelTek, LLC, Yorba Linda, CA (US)

(72) Inventor: Kim Ngoc Vu, Yorba Linda, CA (US)

(73) Assignee: VistadelTek, LLC, Yorba Linda, CA (US)

( * ) Notice: Subject to any disclaimer, the term of this patent is extended or adjusted under 35 U.S.C. 154(b) by 0 days. days.

(21) Appl. No.: 15/641,752

(22) Filed: Jul. 5, 2017

(65) Prior Publication Data
US 2017/0356549 A1    Dec. 14, 2017

Related U.S. Application Data

(62) Division of application No. 14/688,153, filed on Apr. 16, 2015, now Pat. No. 9,739,378.

(60) Provisional application No. 61/980,823, filed on Apr. 17, 2014.

(51) Int. Cl.
*F16L 17/06*     (2006.01)
*F16J 15/08*     (2006.01)

(52) U.S. Cl.
CPC ....... *F16J 15/0806* (2013.01); *F16J 15/0881* (2013.01); *F16J 15/0887* (2013.01)

(58) Field of Classification Search
CPC .. F16J 15/0806; F16J 15/0881; F16J 15/0887; F16L 17/06; H02G 15/04
USPC .................................. 277/608, 609
See application file for complete search history.

(56) References Cited

U.S. PATENT DOCUMENTS

| | | | |
|---|---|---|---|
| 2,926,937 A | 3/1960 | Parsons | |
| 3,158,376 A * | 11/1964 | Rentschler | ........... F16J 15/3232 277/436 |
| 3,208,758 A | 9/1965 | Carlson et al. | |
| 3,521,910 A | 7/1970 | Callahan, Jr. | |
| 4,266,576 A | 5/1981 | Bradford | |
| 4,303,251 A | 12/1981 | Harra et al. | |

(Continued)

FOREIGN PATENT DOCUMENTS

WO     2013153774 A1    10/2013

OTHER PUBLICATIONS

Bird Precision Data Sheet, "Ruby Orifice and Filtered Inserts", 2 pages.

(Continued)

*Primary Examiner* — Nathan Cumar
(74) *Attorney, Agent, or Firm* — Lando & Anastasi, LLP

(57) ABSTRACT

A ring-shaped gasket for making high-purity fluid pathway connections between opposing fluid delivery apparatus elements having at least one simple flat surface in contact with the gasket. The face of at least one apparatus element typically has a circular counterbore depression to receive the gasket, but is not required. The gasket has a body, pierced through by a hole creating a fluid pathway and defining a radial inner surface, and additionally having a radial outer surface, a first axial end surface and a second axial end surface. At least one of the first and second axial end surfaces has a stress concentration feature radially adjacent to a gasket sealing region, the sealing region constructed to be in contact with a face surface of a corresponding fluid conduit port. The stress concentration feature may be a groove or a plurality of cavities disposed adjacent the gasket axial end surface sealing region.

21 Claims, 10 Drawing Sheets

(56) References Cited

U.S. PATENT DOCUMENTS

| | | |
|---|---|---|
| 4,344,459 A | 8/1982 | Nelson |
| 4,552,389 A | 11/1985 | Babuder et al. |
| 4,557,296 A | 12/1985 | Byrne |
| 4,650,227 A | 3/1987 | Babuder et al. |
| 4,830,057 A | 5/1989 | Hendrickson |
| 4,854,597 A | 8/1989 | Leigh |
| 4,880,034 A | 11/1989 | Takahashi |
| 5,002,290 A | 3/1991 | Pernin |
| 5,069,252 A | 12/1991 | Kendrick et al. |
| 5,085,250 A | 2/1992 | Kendrick |
| 5,163,721 A | 11/1992 | Babuder |
| 5,181,542 A | 1/1993 | Wass et al. |
| 5,184,641 A | 2/1993 | Kuhn |
| 5,401,065 A | 3/1995 | Okumura et al. |
| 5,409,270 A | 4/1995 | Shinohara et al. |
| 5,419,372 A | 5/1995 | Wass et al. |
| 5,423,580 A | 6/1995 | Mohlenkamp et al. |
| 5,482,332 A | 1/1996 | Ohmi et al. |
| 5,505,464 A | 4/1996 | McGarvey |
| 5,546,990 A | 8/1996 | Wass et al. |
| 5,673,946 A | 10/1997 | Barber et al. |
| 5,713,582 A | 2/1998 | Swensen et al. |
| 5,720,505 A | 2/1998 | Ohmi et al. |
| 5,730,448 A | 3/1998 | Swensen et al. |
| 5,758,910 A | 6/1998 | Barber et al. |
| 5,797,604 A | 8/1998 | Inagaki et al. |
| 5,803,507 A | 9/1998 | Vu |
| 5,904,381 A | 5/1999 | Ohmi et al. |
| 5,984,318 A | 11/1999 | Kojima et al. |
| 5,992,463 A | 11/1999 | Redemann et al. |
| 6,135,155 A | 10/2000 | Ohmi et al. |
| 6,158,455 A | 12/2000 | Marshall et al. |
| 6,170,890 B1 | 1/2001 | Ohmi et al. |
| 6,318,766 B1 | 11/2001 | Babuder et al. |
| 6,357,760 B1 * | 3/2002 | Doyle ................ F16J 15/0881 277/602 |
| 6,409,180 B1 | 6/2002 | Spence et al. |
| 6,539,968 B1 | 4/2003 | White et al. |
| 6,623,047 B2 | 9/2003 | Olechnowicz et al. |
| 6,688,608 B2 | 2/2004 | Doyle |
| 6,769,697 B1 | 8/2004 | Ishikawa et al. |
| 6,845,984 B2 | 1/2005 | Doyle |
| 6,945,539 B2 | 9/2005 | Whitlow et al. |
| 7,140,647 B2 | 11/2006 | Ohmi et al. |
| 7,169,231 B2 | 1/2007 | Larson et al. |
| 7,207,605 B2 | 4/2007 | Olechnowicz et al. |
| 7,222,643 B2 | 5/2007 | Bailey |
| 7,370,675 B2 | 5/2008 | Cancade et al. |
| 8,356,843 B2 | 1/2013 | Lockwood |
| 2004/0261519 A1 | 12/2004 | Nozoe et al. |
| 2005/0001388 A1 * | 1/2005 | Travers ................ F16J 15/025 277/644 |
| 2005/0253383 A1 * | 11/2005 | Gibb ................ F16L 17/04 285/112 |
| 2009/0261534 A1 * | 10/2009 | Pradelle ................ F16J 15/025 277/648 |

OTHER PUBLICATIONS

Bird Precision Data Sheet, "Sapphire and Ruby Orifice Fittings and Connectors", 2 pages.
Bird Precision, Content Copyright 2006, http://birdprecision.com, 12 pages.
Microflex Technologies, "Products", 4 pages.
Mott Corporation, "Porous Metal Flow Control. Where the Only Variation is in Design", 4 pages.
Swagelok, "VCR Metal Gasket Face Seal Fittings", 2008 Swagelok Company, pp. 1-20.
International Search Report and Written Opinion from corresponding PCT Serial No. PCT/US2015/026093, dated Jul. 20, 2015.
Supplementary Extended European Search Report of the European Patent Office from corresponding EP Application Serial No. 15779865.3 dated Feb. 12, 2018.
First Office Action of the State Intellectual Property Office of China from corresponding Chinese Application Serial No. 201580020189.3 dated Aug. 30, 2017.

* cited by examiner

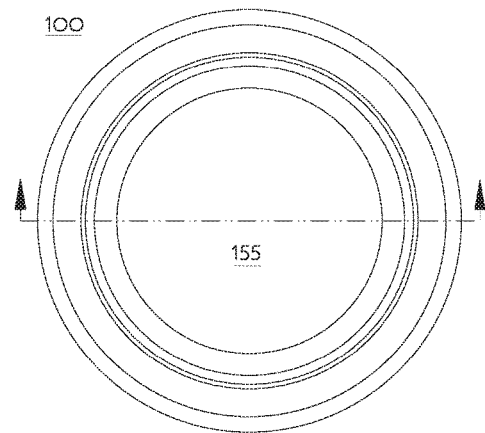
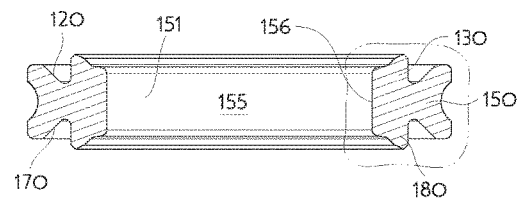
Fig. 1A
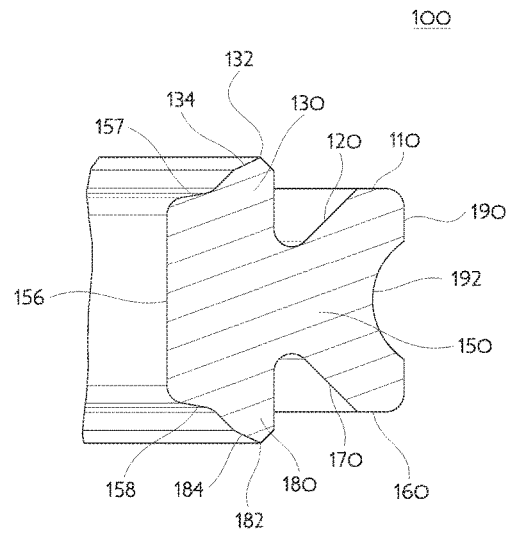
Fig. 1B

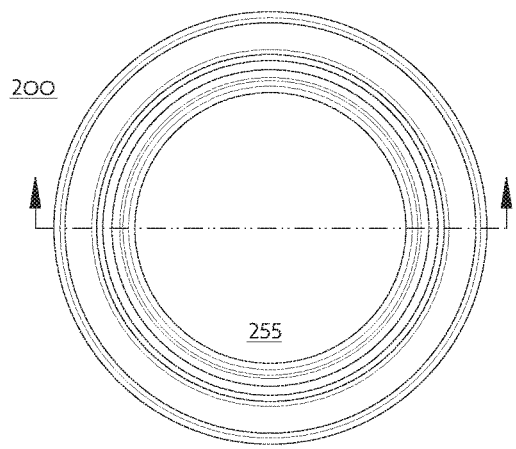
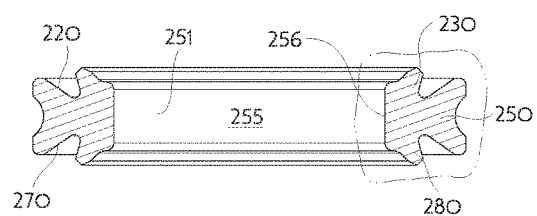
Fig. 2A
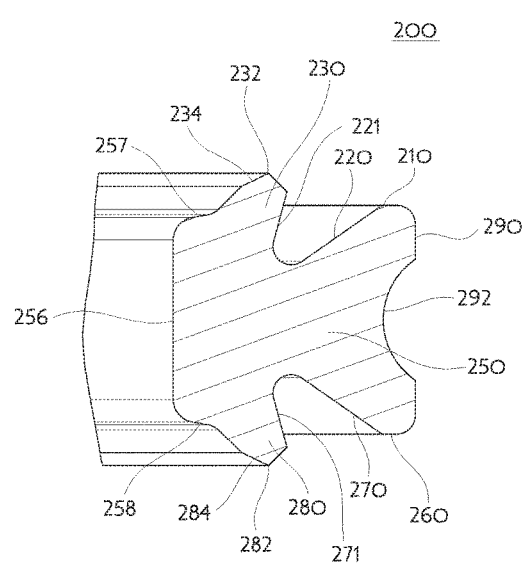
Fig. 2B

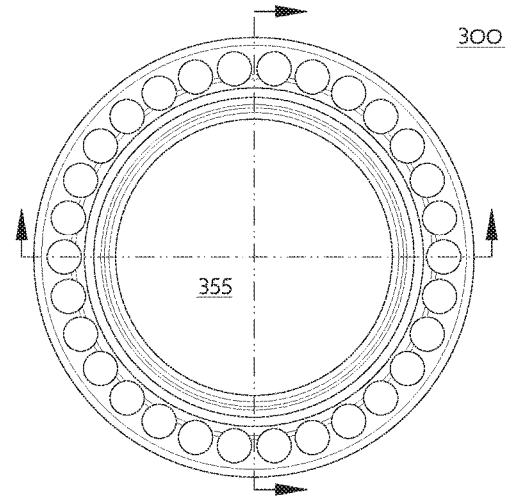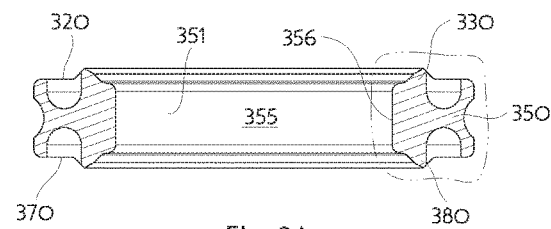
Fig. 3A
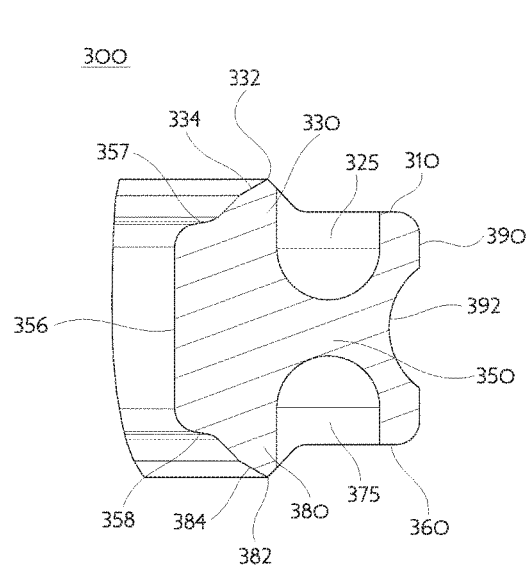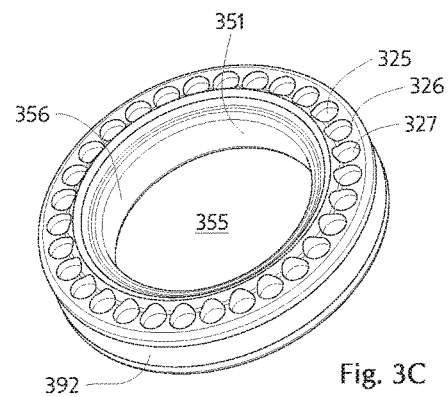
Fig. 3B
Fig. 3C

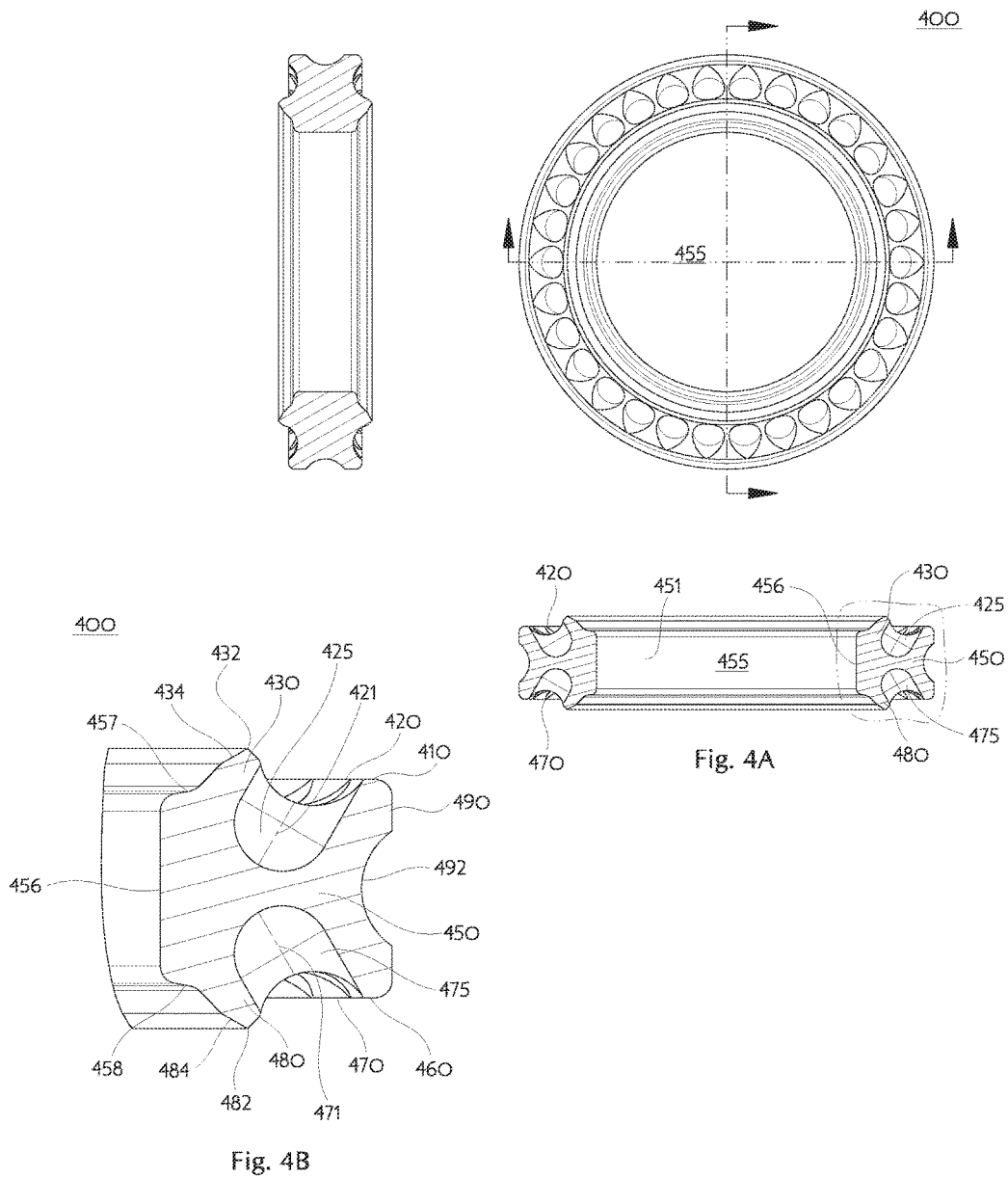

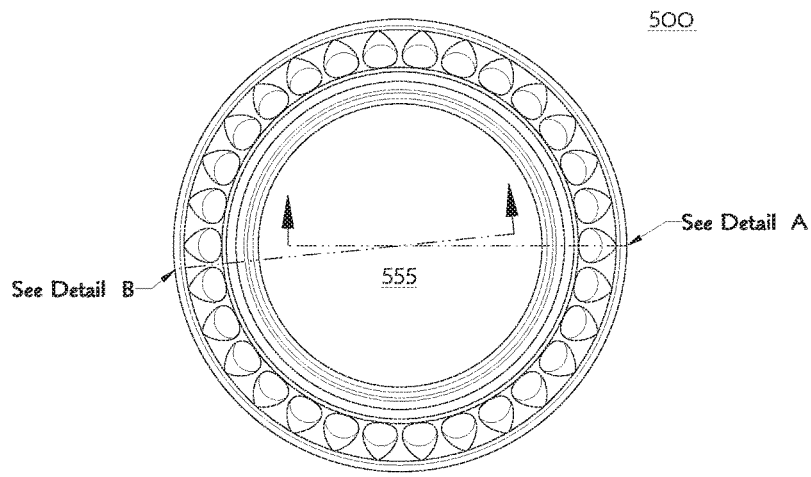
Fig. 5B
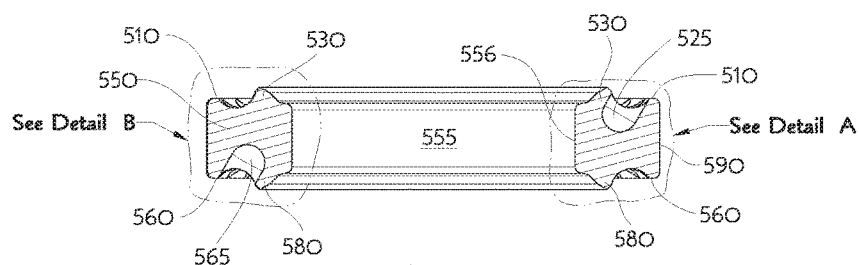
Fig. 5A
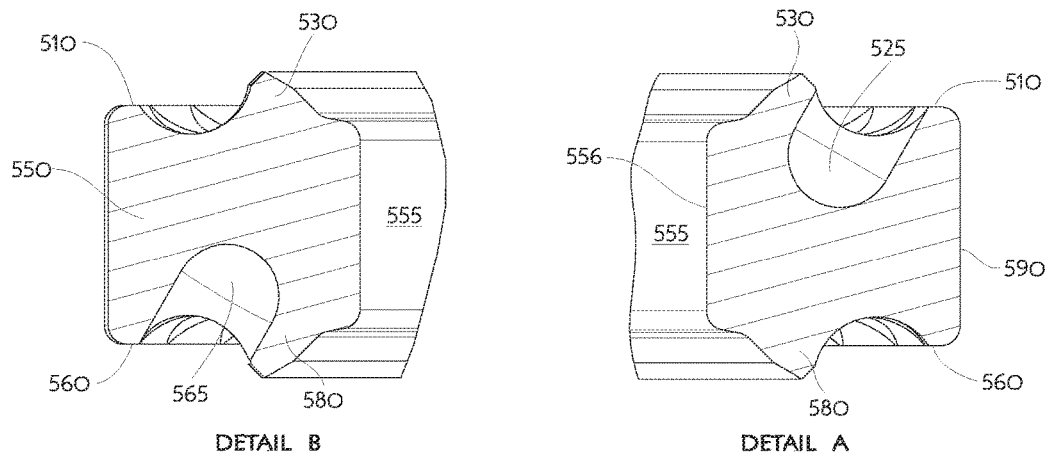
DETAIL B   DETAIL A

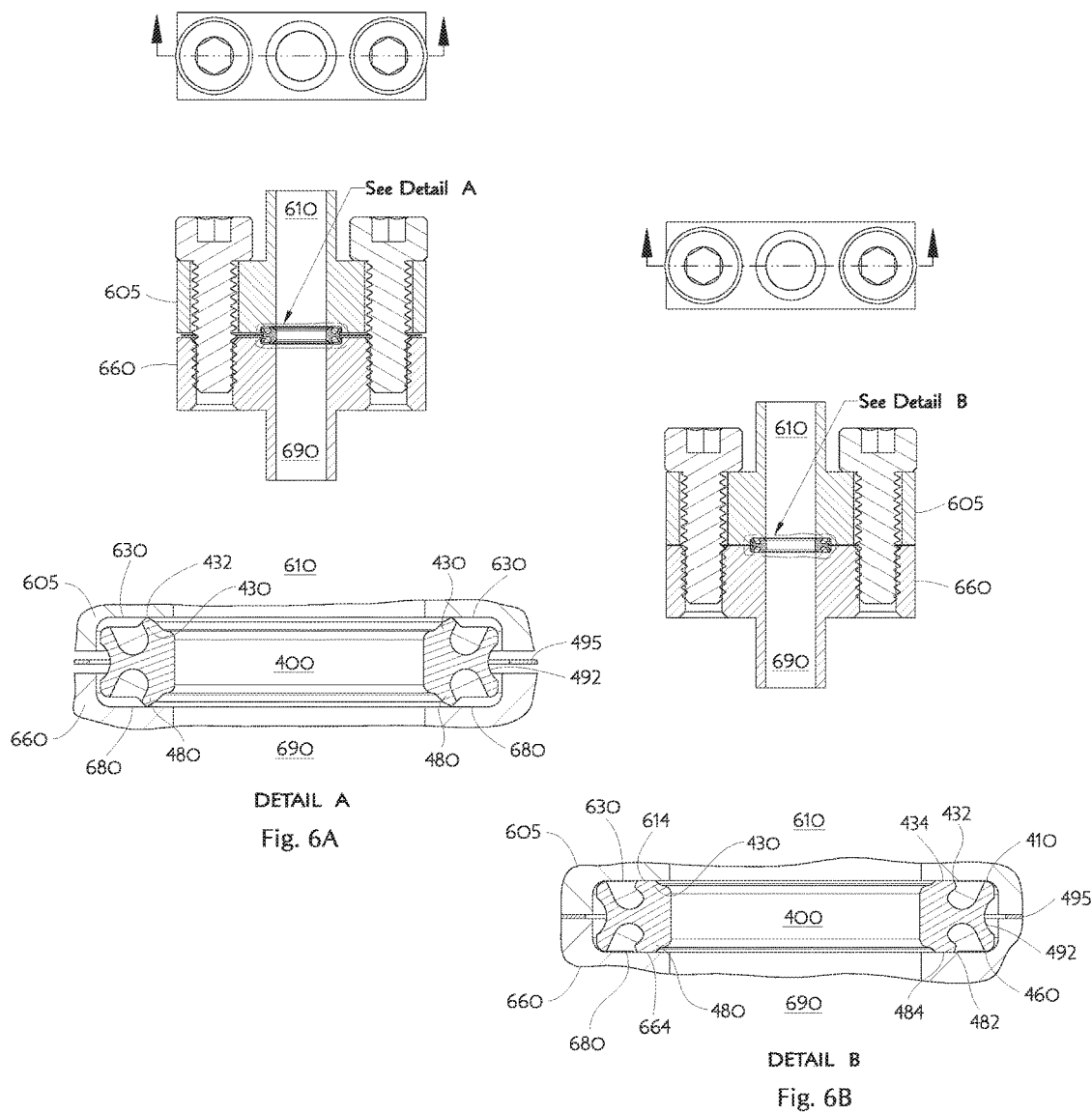

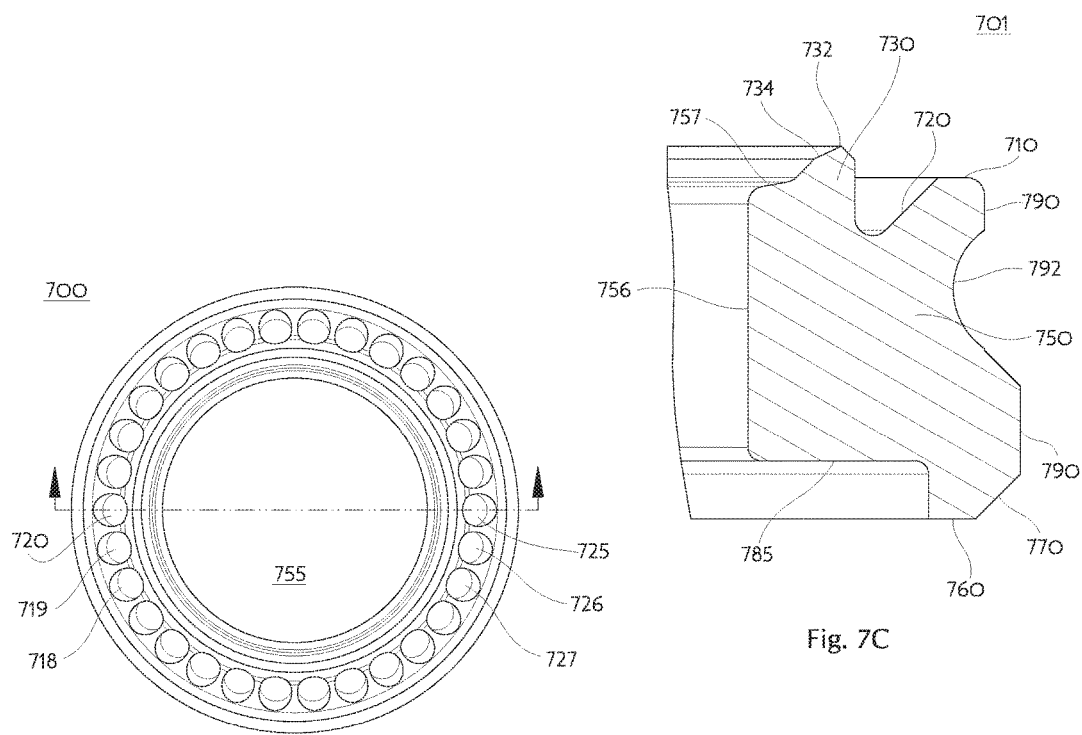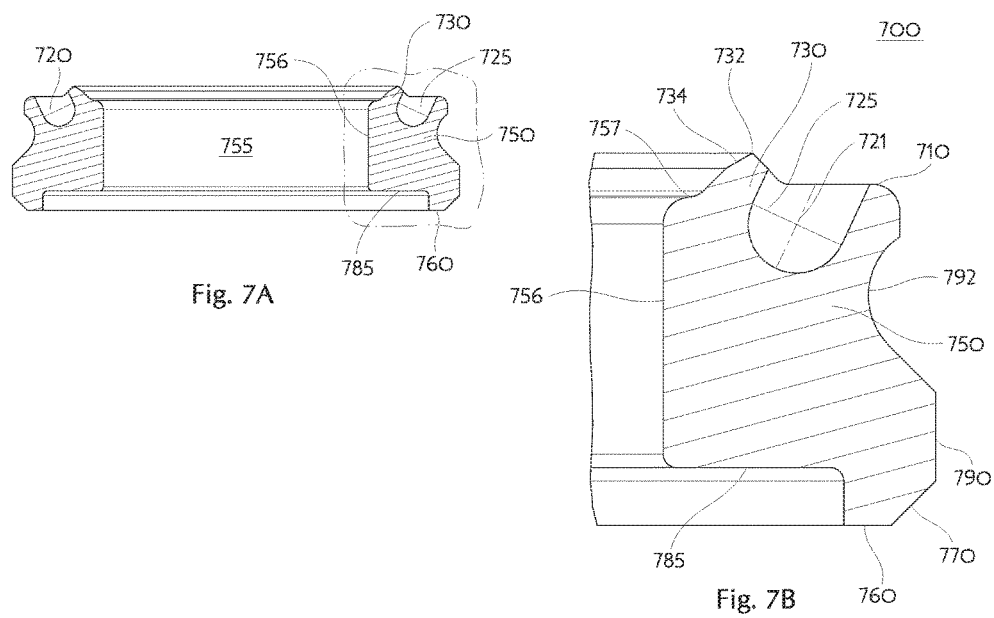

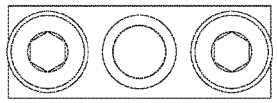
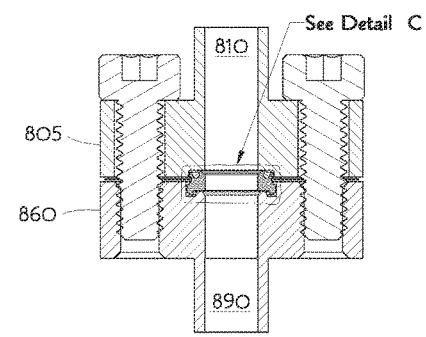
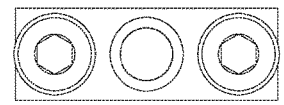
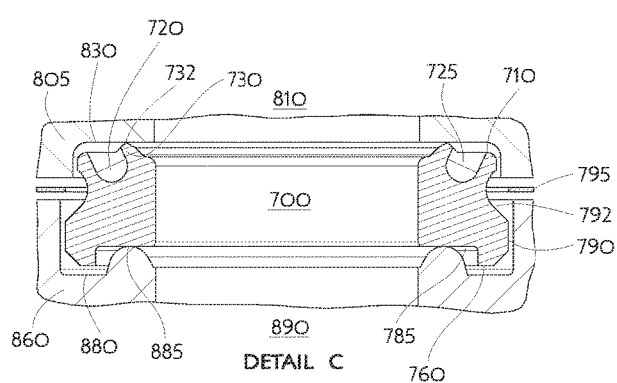
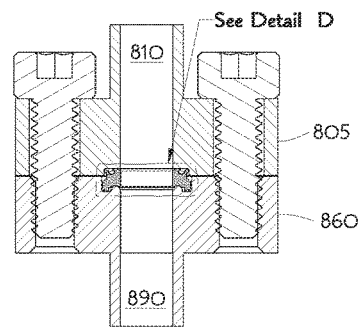
Fig. 8A
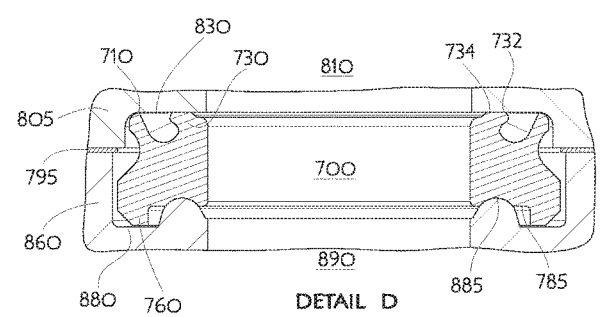
Fig. 8B

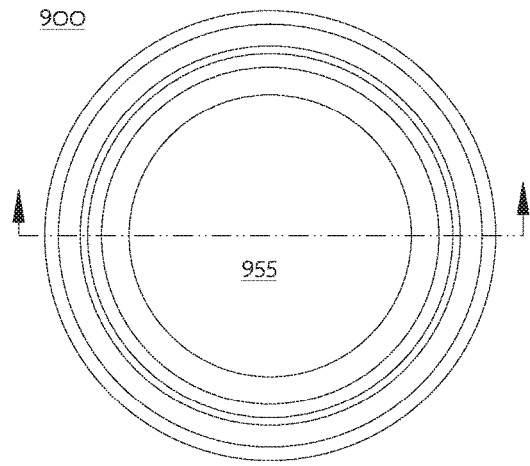
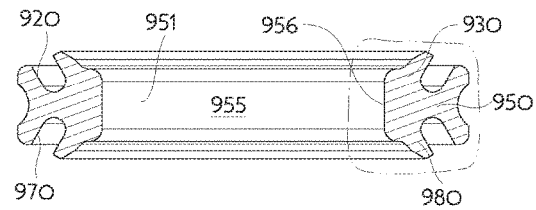
Fig. 9A
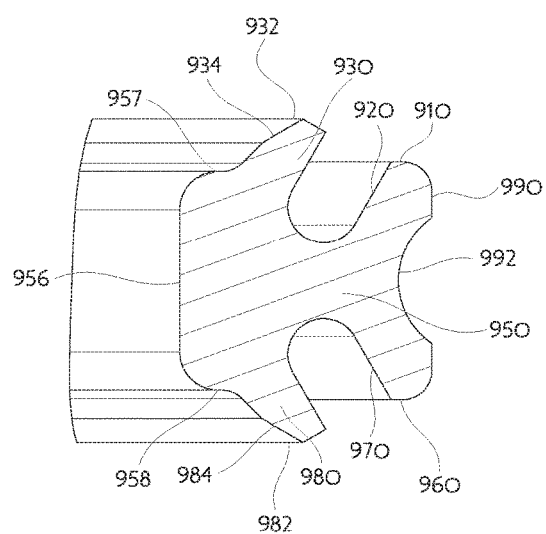
Fig. 9B

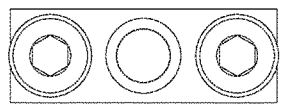
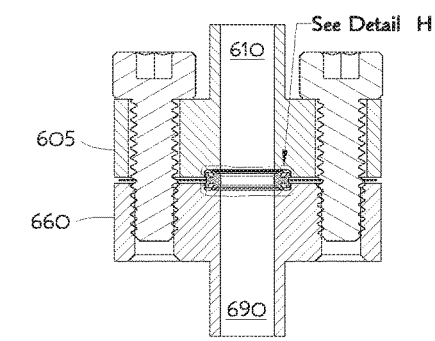
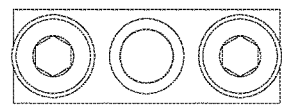
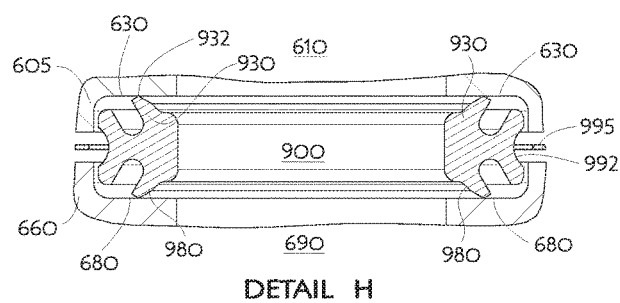
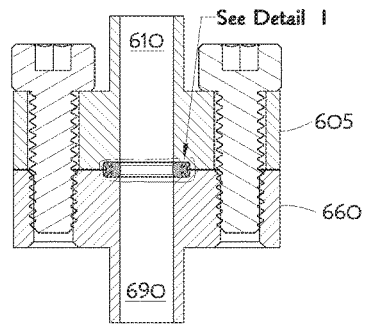
DETAIL H
Fig. 10A
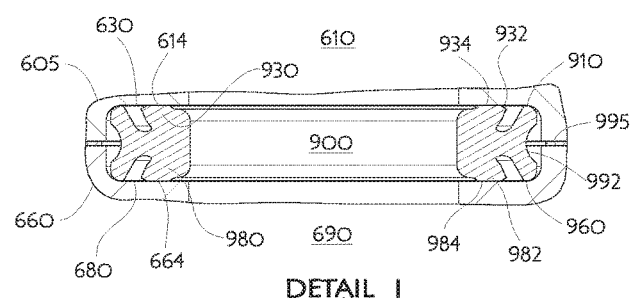
DETAIL I
Fig. 10B

ULTRA-SEAL GASKET FOR JOINING HIGH PURITY FLUID PATHWAYS

CROSS REFERENCE TO RELATED APPLICATIONS

This application claims priority under 35 U.S.C. § 121 as a division of U.S. patent application Ser. No. 14/688,153 titled "ULTRA-SEAL GASKET FOR JOINING HIGH PURITY FLUID PATHWAYS," filed Apr. 16, 2015, which claims priority under 35 U.S.C. § 119(e) to U.S. Provisional Application Ser. No. 61/980,823 titled "ULTRA-SEAL GASKET FOR JOINING HIGH PURITY FLUID PATHWAYS," filed Apr. 17, 2014, each of which is herein incorporated by reference in its entirety.

BACKGROUND OF THE INVENTION

Embodiments of the present invention are related to malleable, primarily metallic, gaskets for sealing joints between portions of a fluid pathway. Many combinations of interface structures and associated gaskets are well known in the design of fluid delivery apparatus. These structures include flanges, glands, component connections, and other functions that enable mechanical assembly of various apparatus elements forming a collection of interconnected fluid pathways. Representative fluid delivery apparatus are found among industrial equipment producing fine chemicals, petroleum products, flat panel electronic displays, or semiconductors, and may be subjected to vacuum, or pressure, or purity requirements, and combinations thereof. Fluid pathways among elements intended for manipulating process materials within semiconductor manufacturing equipment usually require attention to maintaining high purity of the delivered reactants and also typically have a much smaller cross-section than fluid pathways used in petrochemical plants, for example. In many cases practitioners have found metallic gaskets provide superior performance, particularly regarding diffusion of process fluid or contaminants through the gasket and consequent resistance to undesirable leakage, in preference over polymer materials.

One known type of fluid pathway joint uses a ring-shaped gasket, initially flat in a radial direction, axially compressed between nominally identical shaped annular projections that surround circular conduit openings of opposing apparatus elements. The annular projections are urged axially toward each other causing permanent plastic deformation of the ductile metallic gasket creating a seal that will resist leakage of even difficult to contain fluids such as helium. Representative examples of such joints may be seen in U.S. Pat. No. 3,208,758 issued to Carlson and Wheeler (familiarly known as the Varian® Conflat® flange), in U.S. Pat. No. 3,521,910 issued to Callahan and Wennerstrom (familiarly known as the Swagelok® VCR® fitting), and in U.S. Pat. No. 4,303,251 issued to Harra and Nystrom.

Another known type of fluid pathway joint uses a ring-shaped gasket of predetermined cross sectional profile compressed between nominally identical shaped annular projections that surround circular conduit openings of opposing apparatus elements. Representative examples of such joints may be seen in U.S. Pat. No. 4,854,597 issued to Leigh, in U.S. Pat. No. 5,505,464 issued to McGarvey, and in U.S. Pat. No. 6,135,155 issued to Ohmi et al. (an early version of the W-Seal joint type). The patent to Ohmi et al. additionally provides a separate retainer means for holding and centering the gasket during joint assembly. Other separate retainer structures may also be seen in U.S. Pat. No. 5,673,946 and U.S. Pat. No. 5,758,910 both issued to Barber and Aldridge, and in U.S. Pat. No. 7,140,647 issued to Ohmi et al.

Yet another known type of fluid pathway joint (familiarly known as the C-Seal joint type) uses a ring-shaped metallic gasket of complex shape compressed between opposing apparatus elements having simple flat surfaces in contact with the gasket. Most usually the face of at least one apparatus element has a circular counterbore depression to receive the gasket. Representative examples of such joints may be seen in U.S. Pat. No. 5,797,604 issued to Inagaki et al., in U.S. Pat. No. 6,357,760 and U.S. Pat. No. 6,688,608 both issued to Doyle, and in U.S. Pat. No. 6,409,180 issued to Spence & Felber. The '180 patent issued to Spence and Felber additionally provides a separate retainer means for holding and centering the gasket during joint assembly. Other separate retainer structures may also be seen in U.S. Pat. No. 5,984,318 issued to Kojima and Aoyama, in U.S. Pat. No. 6,845,984 issued to Doyle, and in U.S. Pat. No. 6,945,539 issued to Whitlow et al. Additionally, U.S. Pat. No. 5,992,463 issued to the present inventor Kim Ngoc Vu et al, and U.S. Pat. No. 5,730,448 issued to Swensen et al., show a suitably thick retainer may instead provide the compression limiting function of a counterbore sidewall and allow use of a gasket between simple flat opposing faces.

High purity fluid delivery components and fluid pathway elements are often made from a vacuum refined variation of type 316L stainless steel or nickel alloys such as Hastelloy® C-22®. Both of those metallic materials can only be hardened by mechanical work rather than heat treatments and consequently are at risk of being damaged by the localized forces accompanying metallic gaskets. High purity fluid delivery components made from polymer materials are also well known and often used when controlling flow of certain liquid fluids where potential contamination with metallic ions is a concern. In many polymer apparatus designs, fluid pathway joints also use opposed flat surfaces (with or without counterbores) with an interposed gasket. Gaskets made from polymer materials for use in such joints may also benefit from the inventive designs described in this disclosure.

SUMMARY OF THE INVENTION

Embodiments of the present invention are directed to a ring-shaped gasket for sealingly joining opposed fluid conduit ports. The fluid conduit ports may correspond to adjacent fluid conduit ports of a fluid delivery system, such as a semiconductor gas panel, a petrochemical production or distribution system, etc. The gasket has a body, pierced through by a hole creating a fluid pathway and defining a radial inner surface, and additionally having a radial outer surface, a first axial end surface and a second axial end surface. At least one of the first and second axial end surfaces has a stress concentration feature radially adjacent to a gasket sealing region, the gasket sealing region constructed and arranged to be in contact with a face surface of a corresponding fluid conduit port. In one embodiment, the stress concentration feature defines a lip in the gasket sealing region that includes a protective ridge and a sealing surface. Prior to joint assembly the sealing region lip desirably projects axially outward beyond the corresponding axial end surface.

In an embodiment the stress concentration feature comprises a groove in either one or both of the axial end surfaces and adjacent the one or both corresponding gasket sealing regions. In another embodiment the stress concentration groove undercuts one or both sealing regions. In some embodiments, the stress concentration groove has a V-shape undercutting one or both sealing regions, and in other embodiments, the stress concentration groove has a U-shape with substantially parallel sides undercutting one, or both sealing regions.

In yet another embodiment the stress concentration feature comprises a regular arrangement of blind cavities projecting into either one or both of the axial end surfaces. In another embodiment the regularly arranged stress concentrating blind cavities undercut a one or both sealing region lips. In another embodiment the circumferential phase relationship of the blind cavities may be coincident or interposed in anti-phase.

In yet another embodiment a first axial end surface has a stress concentration feature that includes a regular arrangement of blind cavities undercutting a first sealing region and a second axial end surface has a second sealing region initially flat in a radial direction. In another embodiment a first axial end surface has a stress concentration feature including a groove undercutting a first sealing region and a second axial end surface has a second sealing region initially flat in a radial direction. The groove may have a V-shape, or a U-shape with substantially parallel sides. In any embodiment either one or both of the axial end surfaces may have a circumferential region adjacent the gasket radial outer surface which serves as a stop to limit compression of the deformable sealing region.

The ring-shaped gasket of the various embodiments described herein may be formed of a malleable material. The malleable material can include a unitary metallic material selected from the group consisting of a stainless steel alloy, a chromium alloy, a nickel alloy, commercially pure nickel, a copper alloy, and commercially pure copper, a unitary metallic material substantially identical to type 316 series stainless steel alloy, a unitary polymer material selected from the group consisting of polypropylene (PP), polyvinylidene fluoride (PVDF), perfluoroalkoxy polymer (PFA), polytetrafluoroethylene (PTFE), polychlorotrifluoroethylene (PCTFE), and polyimide, or a unitary polymer material substantially identical to polyimide.

In accordance with various aspects described herein, a method of forming a high purity fluid joint is provided wherein a gasket, starting as a closed loop of malleable material having an undeformed gasket sealing surface angled athwart a proximal interior axis of the gasket loop shape, is compressed between opposing fluid delivery apparatus elements until a portion of the gasket sealing surface is bent substantially perpendicular to the proximal interior axis of the gasket loop shape.

BRIEF DESCRIPTION OF DRAWINGS

The accompanying drawings are not intended to be drawn to scale. For purposes of clarity, not every component may be labeled in every drawing. In the drawings:

FIG. 1A is a first representative gasket sectioned on a diameter;

FIG. 1B is an enlarged cross-section of the first representative gasket shown in FIG. 1A;

FIG. 2A is a second representative gasket sectioned on a diameter;

FIG. 2B is an enlarged cross-section of the second representative gasket shown in FIG. 2A;

FIG. 3A is a third representative gasket sectioned on a diameter;

FIG. 3B is an enlarged cross-section of the third representative gasket shown in FIG. 3A;

FIG. 3C is the third representative gasket of FIG. 3A shown in perspective view;

FIG. 4A is a fourth representative gasket sectioned on a diameter;

FIG. 4B is an enlarged cross-section of the fourth representative gasket;

FIG. 5A is a fifth representative gasket sectioned at two locations;

FIG. 5B a plan view of the fifth representative gasket showing the not diametric (anti-phase) relationship of the two sectioning locations;

FIG. 6A illustrates the fourth representative gasket located by a keeper and positioned within fluid conduit port counterbores prior to the application of axial sealing force to make the joint;

FIG. 6B illustrates the fourth representative gasket in fluid conduit port counterbores after the joint has been made;

FIG. 7A is a sixth representative gasket sectioned on a diameter;

FIG. 7B is an enlarged cross-section of the sixth representative gasket shown in FIG. 7A;

FIG. 7C is an enlarged cross-section of an alternative example of the sixth representative gasket in which the stress concentration feature on the first axial end surface of the gasket includes a stress concentration groove;

FIG. 8A illustrates the sixth representative gasket located by a keeper and positioned between a fluid conduit port counterbore having a flat bottom and a fluid conduit port counterbore having a shaped annular projection prior to application of axial sealing force to make the joint;

FIG. 8B illustrates the sixth representative gasket between corresponding fluid conduit port counterbores after the joint has been made;

FIG. 9A is a seventh representative gasket sectioned on a diameter;

FIG. 9B is an enlarged cross-section of the seventh representative gasket shown in FIG. 9A;

FIG. 10A illustrates the seventh representative gasket located by a keeper and positioned within fluid conduit port counterbores prior to the application of axial sealing force to make the joint; and FIG. 10B illustrates the seventh representative gasket in fluid conduit port counterbores after the joint has been made.

DETAILED DESCRIPTION

The examples of the apparatus and methods discussed herein are not limited in application to the details of construction and the arrangement of components set forth in the following description or illustrated in the drawings. The apparatus and methods are capable of other embodiments and of being practiced or of being carried out in various ways. Also, the phrasing and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Making fluid pathway joints with sealing integrity sufficient to minimize leakage on a molecular level (e.g., helium leak rate less than 1×10e-9.std.cc/sec) involves special design considerations. Among skilled designers it is known that making a joint successfully mating metallic fluid delivery apparatus elements using a metallic gasket benefits greatly from plastic deformation of the gasket sealing region that is in contact with the apparatus elements. Suitable deformation becomes more difficult to achieve when changing from gasket materials with relatively large Poisson's Ratio and lower yield strength, such as copper, to gasket materials with smaller Poisson's Ratio and higher yield strength like stainless steels. Additionally, substantial axial force may be necessary to achieve any axial strain in a metallic gasket. One design approach involves making a gasket with axially oriented sealing regions having substantially reduced contact area to encourage plastic deformation of the sealing regions of the gasket without a problematic large increase of the required axial joining force.

A related and often simultaneously used technique to more easily achieve gasket plastic deformation is to anneal the gasket material into a maximally soft condition. Another known design challenge is the relatively high Young's Modulus (Modulus of Elasticity) of metals causing relatively small reversible metallic gasket rebound after elastic deformation and also limiting the amount of strain that may be imparted to a metallic gasket before plastic deformation occurs. As is known in the study of the mechanics of materials, annealing does not appreciably affect the stiffness (Modulus of Elasticity) of the gasket but will appreciably lower its yield strength. The strain-hardening which occurs subsequent to initial yield of many gasket materials can be a significant contributor to the eventual rebound properties of the gasket. A further design challenge is the fact a gasket lacking sufficient bulk hardness may exhibit cold flow relaxation over time and thereby develop a leak despite having been suitably tight initially.

The preceding problematic deformation characteristics may make joint axial dimension tolerances more critical than is desirable in mass production situations and also pose problems which may be described as residual expansion force within a gasket being insufficient to ensure seal integrity. A design solution to these challenges selectively excludes material from the bulk of a ring-shaped part to create a gasket cross-sectional profile inducing intentional and effective stress concentration. This stress concentration causes less axial force to be needed when producing net elastic axial strain and likely produces strain-hardening in some interior regions of the gasket bulk. The resulting reversible elastic axial displacement versus axial force relationship provides a gasket which exhibits greater rebound than otherwise available, and consequently makes a more reliable joint with less total required apparatus element mating force. The exclusion of material may be accomplished, for example, by machining away portions as in the Doyle patents and Spence & Felber patent cited previously, or by forming sheet stock into a torus of "C"-shaped cross-section as shown in U.S. Pat. No. 5,730,448 and U.S. Pat. No. 5,713,582 both issued to Swensen et al., or the desired spring-like behavior can be obtained by actually incorporating a toroidal spring as in the Inagaki patent, among other manufacturing techniques. The designs of Doyle and Spence & Felber remove material in a radial direction and are therefore limited by requirements for guaranteed minimum wall thickness between the gasket internal fluid pathway and the exterior environment. Manufacturing tolerances may have adverse consequences in this regard as well.

In many of the previously cited U.S. patent examples there is considerable risk of adversely scratching the axially oriented sealing region of a gasket prior to joint assembly and such damage thereby making a joint free of leaks unachievable. Gasket centering by a separate retainer provides desirable consistency of alignment between the fluid pathway conduit ports and the central passageway through the gasket. Within some fluid delivery apparatus or devices used for semiconductor manufacturing processes there are situations using multiple types of fluid pathway joints simultaneously and therefore a gasket structure allowing independent tailoring of the physical shape of the gasket sealing surfaces on opposing gasket sealing regions and/or the mechanical behavior of opposing gasket sealing regions is desired.

A first representative example 100 of Applicant's ring-shaped gasket is illustrated in FIG. 1A and FIG. 1B. The gasket body 150 is pierced through by a hole 151 defining a fluid pathway bore 155 comprising an inner radial surface 156 which may conveniently be substantially straight to reduce fluid turbulence in the fluid delivery apparatus coupling joint. The outer radial extent of the gasket body is defined by a radial outer surface 190 which may have a circumferential groove 192 to accommodate a keeper (not shown in FIG. 1A) for locating the gasket 100 in a fluid delivery component assembly (also not shown in FIG. 1A).

The first representative gasket example may have a first axial end surface 110 including a stress concentration feature 120 which appears as a groove in the first axial end surface 110. The stress concentration groove 120 removes gasket body material from the region immediately adjacent the intended gasket sealing region to thereby form a lip 130 which desirably projects axially outward beyond the first axial end surface prior to making the joint. The lip 130 includes an axially prominent protective ridge 132 and an immediately adjacent sealing surface 134. In the event the gasket is slid across a rough surface, during normal factory handling, the protective ridge 132 may be damaged but the sealing surface 134 will remain pristine. The sealing surface 134 is a circumferential sector exhibiting a generally constant angle with respect to the gasket bore 155 axis, and also to the plane of the first axial end surface 110, but may advantageously have a slightly convex shape for some gasket materials. The gasket sealing region lip 130 may be appreciated as resembling a frustoconical shell flaring outward from the gasket bore 155 toward the radial outer surface 190. The radial extent of the sealing surface 134 is beneficially greater than the reduced contact area of prior designs so as to create a radially much longer leak resisting contact between the gasket and fluid conduit port face. When the gasket 100 is made into a leak tight fluid pathway joint by axial compression between opposing flat apparatus faces, the protective ridge 132 will be plastically deformed and the sealing surface 134 slightly deflected radially outward contacting the flat apparatus face, in concert with further axial compression, by virtue of the groove 120 allowing the lip 130 to bend over.

The first representative gasket example may have a second axial end surface 160 including a stress concentration feature 170 which appears as a groove in the second axial end surface 160. The stress concentration groove 170 removes gasket body material from the region immediately adjacent the intended gasket sealing region to thereby form a lip 180 which desirably projects axially outward beyond the second axial end surface prior to making the joint. The lip 180 includes an axially prominent protective ridge 182 and an immediately adjacent sealing surface 184. In the event the gasket is slid across a rough surface, during normal factory handling, the protective ridge 182 may be damaged but the sealing surface 184 will remain pristine. The sealing surface 184 is a circumferential sector exhibiting a generally constant angle with respect to the gasket bore 155 axis, and also to the plane of the second axial end surface 160, but may advantageously have a slightly convex shape for some gasket materials. The radial extent of the sealing surface 184 is beneficially greater than the reduced contact area of prior designs so as to create a radially much longer leak resisting contact between the gasket and fluid conduit port face. When the gasket 100 is made into a leak tight fluid pathway joint by axial compression between opposing flat apparatus faces, the protective ridge 182 will be plastically deformed and the sealing surface 184 slightly deflected radially outward contacting the flat apparatus face, in concert with further axial compression, by virtue of the groove 170 allowing the lip 180 to bend over.

Gasket designers can appreciate how the axial end surfaces 110,160 may function as relatively hard stops preventing excessive compression of the gasket lips 130,180 by contacting the face surface of the corresponding fluid conduit ports. Very minor compositional and manufacturing variations within the gasket 100 may cause an axial end surface 110,160 to contact the corresponding fluid conduit port face before the other axial end surface 160,110 during the process of gasket compression as the joint is being made. The noted hard stop function ensures both opposed gasket lips 130,180 are eventually compressed equally and fully. It should also be appreciated that the end regions 157,158 of the fluid pathway bore 155 will preferably have less axial extent than the axial end surfaces 110,160 to prevent formation of virtual leak cavities within the fluid pathway when the joint is fully mated. Designers may also understand the existence of unaltered central material within the gasket body 150 makes deformation behavior of the first axial end surface lip 130 substantially independent of the deformation behavior of the second axial end surface lip 180.

A second representative example 200 of Applicant's ring-shaped gasket is illustrated in FIG. 2A and FIG. 2B and is similar to the first example. The gasket body 250 is pierced through by a hole 251 defining a fluid pathway bore 255 comprising an inner radial surface 256 which may conveniently be substantially straight to reduce fluid turbulence in the fluid delivery apparatus coupling joint. The outer radial extent of the gasket body is defined by a radial outer surface 290 which may have a circumferential groove 292 to accommodate a keeper (not shown in FIG. 2A nor FIG. 2B) for locating the gasket 200 in a fluid delivery component assembly (also not shown).

The second representative gasket example may have first 210 and second 260 axial end surfaces including stress concentration features 220,270 which appear as grooves in the axial end surfaces 210,260. The stress concentration grooves 220,270 remove gasket body material from the region immediately adjacent both intended gasket sealing regions to thereby form lips 230,280 on the axial end surfaces 210,260 which lips desirably project axially outward beyond the corresponding axial end surfaces 210,260 prior to making the joint. The stress concentration grooves 220,270 have inner walls 221,271 closest the gasket radial inner surface 256 forming an acute angle with the plane of each associated gasket axial end surface 210,260 thereby forming an undercut of each gasket sealing region. The lips 230,280 each include an axially prominent protective ridge 232,282 and an immediately adjacent sealing surface 234, 284. In the event the gasket is slid across a rough surface, during normal factory handling, the protective ridges 232, 282 may be damaged but the sealing surfaces 234,284 will remain pristine. The sealing surfaces 234,284 are circumferential sectors exhibiting a generally constant angle with respect to the gasket bore 255 axis, and also to the plane of each associated axial end surface 210,260, but may advantageously have a slightly convex shape for some gasket materials. The gasket sealing region lips 230,280 may be appreciated as resembling opposite directed frustoconical shells flaring outward from the gasket bore 255 toward the radial outer surface 290. The radial extent of the sealing surfaces 234,284 is beneficially greater than the reduced contact area of prior designs so as to create a radially much longer leak resisting contact between the gasket and fluid conduit port face. When the gasket 200 is made into a leak tight fluid pathway joint by axial compression between opposing flat apparatus faces, the protective ridges 232,282 will be plastically deformed and the sealing surfaces 234, 284 slightly deflected radially outward contacting the flat apparatus faces in concert with further axial compression, as a consequence of the undercut grooves 220,270 allowing the gasket lips 230,280 to controllably bend.

In similar consideration of the second representative gasket example, designers can appreciate how the axial end surfaces 210,260 may function as relatively hard stops preventing excessive compression of the gasket lips 230,280 by contacting the face surface of the corresponding fluid conduit ports. Very minor compositional and manufacturing variations within the gasket 200 may cause an axial end surface 210,260 to contact the corresponding fluid conduit port face before the other axial end surface 260,210 during the process of gasket compression as the joint is being made. The noted hard stop function ensures both opposed gasket lips 230,280 are eventually compressed equally and fully. It should also be appreciated that the end regions 257,258 of the fluid pathway bore 255 will preferably have less axial extent than the axial end surfaces 210,260 to prevent formation of virtual leak cavities within the fluid pathway when the joint is fully mated. Designers may also understand the existence of unaltered central material within the gasket body 250 makes deformation behavior of the first axial end surface lip 230 substantially independent of the deformation behavior of the second axial end surface lip 280. This independence of deformation behavior between the opposite axial end surface lips 230,280 can allow, at the designer's choice, fabrication of gaskets having intentionally different characteristics on opposite sides. Skilled designers will appreciate that lip bending characteristics may be adjusted by choice of the undercut acute angle along with groove depth and width. Thus, for example, one or more of the undercut acute angle, the groove depth, and the groove width may be different on one side of the gasket relative to the undercut acute angle, the groove depth, or the groove width on the opposing side of the gasket. Further, a ring-shaped gasket may be provided with a stress concentration groove on one axial end surface that is similar to stress concentration groove 120 illustrated in FIGS. 1A-1C, and a stress concentration groove on the opposing axial end surface that is similar to stress concentration groove 220 illustrated in FIGS. 2A-2C in which an inner wall 271 of the stress concentration groove 220 closest to the gasket inner radial surface is formed at an acute angle with the plane of gasket axial end surface 260. Accordingly, the use of first and second axial end surface designs which are completely different from each other in physical structure and/or deformation behavior is also contemplated as described further below.

Designers experienced in high purity applications will appreciate the desirability of placing stress concentration features 220,270 outside the "wetted" fluid pathway, to minimize pathway pockets which might capture contaminants, with the resultant design having the gasket sealing region lips 230,280 flaring outward from the gasket bore 255. Applications more concerned with sealing relatively high pathway internal pressures will likely benefit from a fluid energized sealing effect obtainable by having the gasket sealing region lips flaring inward toward the gasket bore. In such an alternative design the internal fluid pressure will then push against the inward flared gasket sealing lips and urge them against their corresponding apparatus elements to effect a tighter seal along the radial contact area. This sort of alternative gasket embodiment would necessarily have one or more stress concentration features being placed closest to the gasket bore and the adjacent sealing region lips being radially farther from the gasket bore.

A third representative example 300 of Applicant's ring-shaped gasket is illustrated in FIG. 3A, FIG. 3B, and FIG. 3C. The gasket body 350 is pierced through by a hole 351 defining a fluid pathway bore 355 comprising an inner radial surface 356 which may conveniently be substantially straight to reduce fluid turbulence in the fluid delivery apparatus coupling joint. The outer radial extent of the gasket body is defined by a radial outer surface 390 which may have a circumferential groove 392 to accommodate a keeper (not shown in FIG. 3A, 3B, nor 3C) for locating the gasket 300 in a fluid delivery component assembly (also not shown in the Figures).

The third representative gasket example may have a first axial end surface 310 including a stress concentration feature 320 comprised of a regular arrangement of blind cavities projecting into the first axial end surface 310. The stress concentration cavities 325,326,327, et seq., remove gasket body material from the region immediately adjacent the intended gasket sealing region to thereby form a lip 330 on the axial first end surface 310 which desirably projects axially outward beyond the first axial end surface prior to making the joint. The lip 330 includes an axially prominent protective ridge 332 and an immediately adjacent sealing surface 334. The sealing surface 334 is a circumferential sector exhibiting a generally constant angle with respect to the gasket bore 355 axis, and also to the plane of the first axial end surface 310, but may advantageously have a slightly convex shape for some gasket materials. The gasket sealing region lip 330 may be appreciated as resembling a frustoconical shell flaring outward from the gasket bore 355 toward the radial outer surface 390. The radial extent of the sealing surface 334 is beneficially greater than the reduced contact area of prior designs so as to create a radially much longer leak resisting contact between the gasket and fluid conduit port face. In the event the gasket is slid across a rough surface, during normal factory handling, the protective ridge 332 may be damaged but the sealing surface 334 will remain pristine. When the gasket 300 is made into a leak tight fluid pathway joint by axial compression between opposing flat apparatus faces, the protective ridge 332 will be plastically deformed and the sealing surface 334 slightly deflected radially outward, in concert with further axial compression, by virtue of the cavities 325,326,327, et seq., allowing the lip 330 to bend over.

The third representative gasket example may have a second axial end surface 360 including a stress concentration feature 370 that includes a regular arrangement of blind cavities projecting into the second axial end surface 360. The stress concentration cavities 375,376,377, et seq., remove gasket body material from the region immediately adjacent the intended gasket sealing region to thereby form a lip 380 on the second axial end surface 360 which desirably projects axially outward beyond the corresponding axial end surface prior to making the joint. The lip 380 includes an axially prominent protective ridge 382 and an immediately adjacent sealing surface 384. The sealing surface 384 is a circumferential sector exhibiting a generally constant angle with respect to the gasket bore 355 axis, and also to the plane of the second axial end surface 360, but may advantageously have a slightly convex shape for some gasket materials. The radial extent of the sealing surface 384 is beneficially greater than the reduced contact area of prior designs so as to create a radially much longer leak resisting contact between the gasket and fluid conduit port face. In the event the gasket is slid across a rough surface, during normal factory handling, the protective ridge 382 may be damaged but the sealing surface 384 will remain pristine. When the gasket 300 is made into a leak tight fluid pathway joint by axial compression between opposing flat apparatus faces, the protective ridge 382 will be plastically deformed and the sealing surface 384 slightly deflected radially outward, in concert with further axial compression, by virtue of the cavities 375,376,377, et seq. allowing the lip 380 to bend over. Although the stress concentration cavities 325,326,327 and 375,376,377 disposed on opposing axial faces of the gasket 300 are illustrated to be in phase with one another around the circumference of the gasket, it should be appreciated that they may instead be disposed in anti-phase with one another, as described further below with respect to FIG. 5A and FIG. 5B.

In similar consideration of the third representative gasket example, designers can appreciate how the axial end surfaces 310,360 may function as relatively hard stops preventing excessive compression of the gasket lips 330,380 by contacting the face surface of the corresponding fluid conduit ports. Very minor compositional and manufacturing variations within the gasket 300 may cause an axial end surface 310,360 to contact the corresponding fluid conduit port face before the other axial end surface 360,310 during the process of gasket compression as the joint is being made. The noted hard stop function ensures both opposed gasket lips 330,380 are eventually compressed equally and fully. It should also be appreciated that the end regions 357,358 of the fluid pathway bore 355 will preferably have less axial extent than the axial end surfaces 310,360 to prevent formation of virtual leak cavities within the fluid pathway when the joint is fully mated. Designers may also understand the existence of unaltered central material within the gasket body 350 makes deformation behavior of the first axial end surface lip 330 substantially independent of the deformation behavior of the second axial end surface lip 380.

A fourth representative example 400 of Applicant's ring-shaped gasket illustrated in FIG. 4A and FIG. 4B is similar to the third example. The gasket body 450 is pierced through by a hole 451 defining a fluid pathway bore 455 comprising an inner radial surface 456 which may conveniently be substantially straight to reduce fluid turbulence in the fluid delivery apparatus coupling joint. The outer radial extent of the gasket body is defined by a radial outer surface 490 which may have a circumferential groove 492 to accommodate a keeper (not shown in FIG. 4A nor FIG. 4B) for locating the gasket 400 in a fluid delivery component assembly (also not shown).

The fourth representative gasket example may have first 410 and second 460 axial end surfaces including stress concentration features 420,470 including regular arrangements of blind cavities 425,475 projecting into both the axial end surfaces 410,460. The stress concentration cavities 425,475 remove gasket body material from the region immediately adjacent both intended gasket sealing regions to thereby form lips 430,480 on the axial end surfaces 410,460 which lips desirable project axially outward beyond the corresponding axial end surfaces 410,460 prior to making the joint. Each cavity among the plurality of stress concentration cavities 425,475 has individual volumetric axes 421,471 forming an acute angle with the plane of the associated gasket axial end surface 410,460 thereby forming a plurality of undercuts of the gasket sealing regions. The lips 430,480 each include an axially prominent protective ridge 432,482 and an immediately adjacent sealing surface 434,484. In the event the gasket is slid across a rough surface, during normal factory handling, the protective ridges 432,482 may be damaged but the sealing surfaces 434,484 will remain pristine. The sealing surfaces 434,484 are circumferential sectors exhibiting a generally constant angle with respect to the gasket bore 455 axis, and also to the plane of each associated axial end surface 410,460, but may advantageously have a slightly convex shape for some gasket materials. The gasket sealing region lips 430,480 may be appreciated as resembling opposite directed frustoconical shells flaring outward from the gasket bore 455 toward the radial outer surface 490. The radial extent of the sealing surfaces 434,484 is beneficially greater than the reduced contact area of prior designs so as to create a radially much longer leak resisting contact between the gasket and fluid conduit port face. When the gasket 400 is made into a leak tight fluid pathway joint by axial compression between opposing flat apparatus faces, the protective ridges 432,482 will be plastically deformed and the sealing surfaces 434, 484 slightly deflected radially outward in concert with further axial compression, as a consequence of the undercut cavities 425,475 allowing the gasket lips 430,480 to controllably bend.

In similar consideration of the fourth representative gasket example, designers can appreciate how the axial end surfaces 410,460 may function as relatively hard stops preventing excessive compression of the gasket lips 430,480 by contacting the face surface of the corresponding fluid conduit ports. Very minor compositional and manufacturing variations within the gasket 400 may cause an axial end surface 410,460 to contact the corresponding fluid conduit port face before the other axial end surface 460,410 during the process of gasket compression as the joint is being made. The noted hard stop function ensures both opposed gasket lips 430,480 are eventually compressed equally and fully. It should also be appreciated that the end regions 457,458 of the fluid pathway bore 455 will preferably have less axial extent than the axial end surfaces 410,460 to prevent formation of virtual leak cavities within the fluid pathway when the joint is fully mated. Designers may also understand the existence of unaltered central material within the gasket body 450 makes deformation behavior of the first axial end surface lip 430 substantially independent of the deformation behavior of the second axial end surface lip 480.

Skilled gasket designers will further appreciate the first and second axial end surface shapes acting relatively independently also contemplates a design combination comprised of a stress concentration groove on one face and a plurality of stress concentration cavities on the opposite face. For example, in some embodiments, the stress concentration feature on one face may be similar to the stress concentration grooves 120,170 of FIGS. 1A-C, or the stress concentration grooves 220,270 of FIGS. 2A-C, while the stress concentration feature on the opposing face may include a plurality of stress concentration cavities similar to the stress concentration cavities 325,326,327 of FIGS. 3A-C, or the stress concentration cavities 425,475 of FIGS. 4A-B. Additionally, when a plurality of stress concentration cavities is designed into both the first and second axial end surfaces, then the individual volumetric axes of opposing cavities may be circumferentially aligned as in FIG. 4A or may alternatively be interleaved as in FIG. 5A and FIG. 5B illustrating a fifth gasket example 500. Corresponding elements in FIG. 5A include a gasket body 550, an inner radial surface 556, a first axial end surface 510 with lip 530 and associated blind cavities 525, and a second axial end surface 560 with lip 580 and associated blind cavities 565. The top plan view in FIG. 5B shows how the cross sectioned illustration reveals the cavities of one axial end surface are substantially anti-phase interposed with the cavities of the opposite axial end surface. It should also be appreciated FIG. 5A illustrates a gasket wherein the radial outer surface 590 lacks a groove for a keeper since the keeper groove is optional in all examples.

FIG. 6A and FIG. 6B illustrate how a seal is effected when a ring-shaped metallic gasket of the fourth exemplary shape 400 is compressed between opposing apparatus elements 605,660 having simple flat surfaces 630,680 in contact with the gasket 400. The sealing region lips 430,480 initially contact the fluid delivery apparatus element flat surfaces 630,680 along the protective ridges 432,482 when the apparatus elements 605,660 are urged toward each other by fasteners or mating component threads as illustrated in FIG. 6A. A thin keeper 495 engaged with an exterior circumferential groove 492 may assist with positioning of the gasket 400 between the opposing fluid conduit ports 610,690. As illustrated in FIG. 6B after complete axial compression of the made-up joint, the opposing apparatus elements 605,660 abut the gasket axial end surfaces 410,460 and the gasket lips 430,480 have bent outward so that the sealing surfaces 434,484 have come into flat contact with the corresponding fluid delivery apparatus element fluid conduit port face surfaces 614,664. It should be appreciated that the radial extent of the radial outer surface 490 of the gasket 400 is preferably less than the radial extent of the flat surfaces 630,680 of the opposing apparatus elements, both before and after compression between the opposing apparatus elements 605,660, as shown in FIGS. 6A and 6B.

A sixth representative example 700 of Applicant's ring-shaped gasket is illustrated in FIG. 7A and FIG. 7B. The gasket body 750 is pierced through by a hole defining a fluid pathway bore 755 comprising an inner radial surface 756 which may conveniently be substantially straight to reduce fluid turbulence in the fluid delivery apparatus coupling joint. The outer radial extent of the gasket body is defined by a radial outer surface 790 which may have a circumferential groove 792 to accommodate a keeper (not shown in FIG. 7A nor FIG. 7B) for locating the gasket 700 in a fluid delivery component assembly (also not shown).

The sixth representative gasket example may have a first axial end surface 710 including a stress concentration feature that includes a regular arrangement of blind cavities 718,719,720, et seq. & 725,726,727 et seq. projecting into the first axial end surface 710. The stress concentration cavities 725, etc. remove gasket body material from the region immediately adjacent the intended gasket sealing region to thereby form a lip 730 on the first axial end surface 710 which lip desirably projects axially outward beyond the corresponding first axial end surface 710 prior to making the joint. Each cavity among the plurality of stress concentration cavities 725, etc. has individual volumetric axes 721 forming an acute angle with the plane of the associated first gasket axial end surface 710 thereby forming a plurality of undercuts of the gasket sealing region. The lip 730 includes an axially prominent protective ridge 732 and an immediately adjacent sealing surface 734. In the event the gasket is slid across a rough surface, during normal factory handling, the protective ridge 732 may be damaged but the sealing surface 734 will remain pristine. The sealing surface 734 is a circumferential sector exhibiting a generally constant angle with respect to the gasket bore 755 axis, and also to the plane of the associated first axial end surface 710, but may advantageously have a slightly convex shape for some gasket materials. The radial extent of the sealing surface 734 is beneficially greater than the reduced contact area of prior designs so as to create a radially much longer leak resisting contact between the gasket and fluid conduit port face. When the gasket 700 is made into a leak tight fluid pathway joint by axial compression between opposing flat apparatus faces, the protective ridge 732 will be plastically deformed and the sealing surface 734 slightly deflected radially outward in concert with further axial compression, as a consequence of the undercut cavities 725, etc. allowing the gasket lip 730 to controllably bend. It should be appreciated a groove stress concentration feature, as previously described in the first and second gasket examples, may alternatively be used on the first axial end surface of the presently described gasket example. Such an alternative example 701 of Applicant's sixth representative gasket example is illustrated in FIG. 7C, in which reference designators 710,720,730,732,734, and 757 correspond to features 110,120,130,132,134, and 157 described previously with respect to FIGS. 1A-C. Although not shown, it should be appreciated that a stress concentration groove similar to that described with respect to FIGS. 2A-C could alternatively be used.

The sixth representative gasket example may have a second axial end surface 760 including an exterior chamfer 770 blending into the radial outer surface 790 for convenience. A sealing region 785 initially flat in a radial direction, suitable for use with fluid delivery elements having annular projections surrounding circular conduit openings, is formed as a circumferential sector generally perpendicular with respect to the gasket bore 755 axis and parallel to the plane of the second axial end surface 760. The axial extent of the initially flat sealing region 785 may advantageously be less than the second axial end surface 760 so as to be effectively recessed within the second axial end surface 760. In the event the gasket is slid across a rough surface, during normal factory handling, the second axial end surface 760 may be damaged but the sealing surface 785 will remain pristine. When the gasket 700 is made into a leak tight fluid pathway joint by axial compression between opposing fluid delivery element conduit ports, an annular projection will cause permanent plastic deformation of the gasket sealing region 785 as further described below.

In consideration of the sixth representative gasket example, designers can appreciate how the first axial end surface 710 may function as a relatively hard stop preventing excessive compression of the gasket lip 730 by contacting the face surface of a corresponding first fluid conduit port. It should also be appreciated that the first end region 757 of the fluid pathway bore 755 will preferably have less axial extent than the first axial end surface 710 to prevent formation of virtual leak cavities within the fluid pathway when the joint is fully mated. Designers may also understand the existence of unaltered central material within the gasket body 750 makes deformation behavior of the first axial end surface lip 730 substantially independent of the deformation behavior of the second axial end surface sealing region 785. This independence of deformation behavior is used to advantage in the sixth representative gasket example as further described below with respect to FIG. 8A and FIG. 8B.

FIG. 8A and FIG. 8B illustrate how a seal is effected when a ring-shaped metallic gasket of the sixth exemplary shape 700 is compressed between opposing fluid delivery apparatus elements 805,860. FIG. 8A illustrates the sixth representative gasket located by a keeper 795 and positioned between an upper fluid conduit port counterbore 830 having a flat bottom and a lower fluid conduit port counterbore 880 having a shaped annular projection 885 prior to application of axial sealing force to make the joint. FIG. 8B illustrates the sixth representative gasket 700 between corresponding fluid conduit port counterbores after the joint has been made. The sealing region lip 730 initially contacts the fluid delivery apparatus element flat surface 830 along the protective ridge 732, and the initially flat sealing region 785 contacts the annular projection 885, when the apparatus elements 805,860 are urged toward each other by fasteners (or mating component threads or other means) as illustrated in FIG. 8A. The thin keeper 795 engaged with an exterior circumferential groove 792 may assist with positioning of the gasket 700 between the opposing fluid conduit ports 810,890. During the process of gasket compression, as the joint is being made, the hard stop function of the first axial end surface 710 contacting against the upper fluid conduit port counterbore 830 ensures all additional closing motion, joining the opposed fluid conduit ports 810,890, will result in proper indentation of the initially flat sealing region 785 by the lower fluid conduit port annular projection 885. As illustrated in FIG. 8B after complete axial compression of the made-up joint, the gasket lip 730 has bent outward so that the sealing surface 734 comes into flat contact with the corresponding fluid delivery apparatus element fluid conduit port face surface 830 while the initially flat sealing region 785 has been deformed by the annular projection 885 pressing into same. When the apparatus elements 805,860 contact the keeper 795 no further gasket compression is feasible. The axial extent of the second axial end surface 760 may be chosen in conjunction with thickness of the keeper 795 so as to ensure a gap between the second axial end surface 760 and the bottom of the lower fluid conduit port counterbore 880. A gap may be desired to ensure sealing occurs only between the shaped annular projection 885 and the initially flat (but now deformed) second axial end surface sealing region 785 while also allowing helium leak detection methods of testing joint integrity. It should be appreciated that the radial extent of the radial outer surface 790 of the gasket 700 is preferably less than the radial extent of the counterbore 830 of the fluid delivery apparatus element 805 and the radial extent of the counterbore 880 of the fluid delivery apparatus element 860, both before and after compression between the opposing apparatus elements 805,860, as shown in FIGS. 8A and 8B.

A seventh representative example 900 of Applicant's ring-shaped gasket is illustrated in FIG. 9A and FIG. 9B and is similar to the first and second representative examples. The gasket body 950 is pierced through by a hole 951 defining a fluid pathway bore 955 comprising an inner radial surface 956 which may conveniently be substantially straight to reduce fluid turbulence in the fluid delivery apparatus coupling joint. The outer radial extent of the gasket body is defined by a radial outer surface 990 which may again have a circumferential groove 992 to accommodate a keeper (not shown in FIG. 9A nor FIG. 9B) for locating the gasket 900 in a fluid delivery component assembly (also not shown). The presence of groove 992 to accommodate a keeper is optional in this representative example, as previously described with respect to the prior representative gasket examples.

The seventh representative gasket example may have first 910 and second 960 axial end surfaces including stress concentration features 920,970 which again appear as grooves in the axial end surfaces 910,960. The stress concentration grooves 920,970 remove gasket body material from the region immediately adjacent both intended gasket sealing regions to thereby form lips 930,980 on the axial end surfaces 910,960 which lips desirably project axially outward beyond the corresponding axial end surfaces 910,960 prior to making the joint. In a manner similar to that of the second representative gasket example illustrated in FIGS. 2A and 2B, the stress concentration grooves 920,970 have inner walls closest the gasket radial inner surface 956 that form an acute angle with the plane of each associated gasket axial end surface 910,960 thereby forming an undercut of each gasket sealing region. However, in contrast to the second representative gasket example of FIGS. 2A and 2B, the stress concentration grooves 920,970 of this seventh representative gasket example have radially inner and outer groove walls that are substantially parallel to one another thereby defining a U-shaped groove, rather than the substantially V-shaped grooves 220,270 depicted in the second representative gasket example of FIGS. 2A and 2B. The substantially parallel radially inner and outer groove walls of the stress concentration grooves 920,970 thereby each form an acute angle with the plane of each associated gasket axial end surface 910,960. As in the previously described representative gasket examples, the lips 930,980 each include an axially prominent protective ridge 932,982 and an immediately adjacent sealing surface 934,984. In the event the gasket is slid across a rough surface, for example, during normal factory handling, the protective ridges 932,982 may be damaged but the sealing surfaces 934,984 will remain pristine. The sealing surfaces 934,984 are circumferential sectors exhibiting a generally constant angle with respect to the gasket bore 955 axis, and also to the plane of each associated axial end surface 910,960, but as previously described may advantageously have a slightly convex shape for some gasket materials. It will be appreciated that the gasket sealing region lips 930,980 may again resemble opposite directed frustoconical shells flaring outward from the gasket bore 955 toward the radial outer surface 990. As in the previously described representative gasket examples, the radial extent of the sealing surfaces 934,984 is beneficially greater than the reduced contact area of prior designs so as to create a radially much longer leak resisting contact between the gasket and fluid conduit port face. When the gasket 900 is made into a leak tight fluid pathway joint by axial compression between opposing flat apparatus faces, the protective ridges 932,982 will be plastically deformed and the sealing surfaces 934,984 slightly deflected radially outward contacting the flat apparatus faces in concert with further axial compression, as a consequence of the undercut grooves 920,970 allowing the gasket lips 930,980 to controllably bend, as described further with respect to FIGS. 10A and 10B.

In similar consideration of the previously described representative gasket examples, designers can appreciate how the axial end surfaces 910,960 may function as relatively hard stops preventing excessive compression of the gasket lips 930,980 by contacting the face surface of the corresponding fluid conduit ports. Very minor compositional and manufacturing variations within the gasket 900 may cause an axial end surface 910,960 to contact the corresponding fluid conduit port face before the other axial end surface 960,910 during the process of gasket compression as the joint is being made. However, the noted hard stop function ensures both opposed gasket lips 930,980 are eventually compressed equally and fully. It should also be appreciated that the end regions 957,958 of the fluid pathway bore 955 will preferably have less axial extent than the axial end surfaces 910,960 to prevent formation of virtual leak cavities within the fluid pathway when the joint is fully mated.

Skilled designers will appreciate the existence of unaltered central material within the gasket body 950 makes deformation behavior of the first axial end surface lip 930 substantially independent of the deformation behavior of the second axial end surface lip 980. This independence of deformation behavior between the opposite axial end surface lips 930,980 can allow, at the designer's choice, fabrication of gaskets having intentionally different characteristics on opposite sides. Skilled designers will appreciate that lip bending characteristics may be adjusted by choice of the undercut acute angle along with groove depth and width. Thus, for example, one or more of the undercut acute angle, the groove depth, and the groove width may be different on one side of the gasket relative to the undercut acute angle, the groove depth, or the groove width on the opposing side of the gasket. Further, a ring-shaped gasket may be provided with a stress concentration groove on one axial end surface that is similar to the stress concentration groove 120 illustrated in FIGS. 1A-1C, or the stress concentration groove 220 illustrated in FIGS. 2A-2C, with the other stress concentration feature on the opposing axial end surface being similar to the stress concentrations grooves 920 or 970 described above. Alternatively still, ring-shaped gaskets may be provided with a stress concentration feature on one axial end surface that is similar to the stress concentration grooves 920,970 described above, with the opposing axial end surface being constructed to form a fluid tight seal with fluid delivery elements having annular projections surrounding circular conduit openings in the manner previously described with respect to FIGS. 7A and 7B. Accordingly, it should be appreciated that the various representative gasket designs disclosed herein are not limited to gaskets having substantially symmetric axial end surfaces, as the use of first and second axial end surface designs which are completely different from each other in physical structure and/or deformation behavior is also contemplated.

Designers experienced in high purity applications will appreciate the desirability of placing stress concentration features 920,970 outside the "wetted" fluid pathway, to minimize pathway pockets which might capture contaminants, with the resultant design having the gasket sealing region lips 930,980 flaring outward from the gasket bore 955. Applications more concerned with sealing relatively high pathway internal pressures will likely benefit from a fluid energized sealing effect obtainable by having the gasket sealing region lips flaring inward toward the gasket bore. In such an alternative design the internal fluid pressure will then push against the inward flared gasket sealing lips and urge them against their corresponding apparatus elements to effect a tighter seal along the radial contact area. This sort of alternative gasket embodiment would necessarily have one or more stress concentration features being placed closest to the gasket bore and the adjacent sealing region lips being radially farther from the gasket bore.

FIG. 10A and FIG. 10B illustrate how a seal is effected when a ring-shaped metallic gasket of the seventh exemplary shape 900 is compressed between opposing apparatus elements 605,660 having simple flat surfaces 630,680 in contact with the gasket 900. The sealing region lips 930,980 initially contact the fluid delivery apparatus element flat surfaces 630,680 along the protective ridges 932,982 when the apparatus elements 605,660 are urged toward each other by fasteners or mating component threads as illustrated in FIG. 10A. A thin keeper 995 engaged with an exterior circumferential groove 992 of the gasket 900 may assist with positioning of the gasket 900 between the opposing fluid conduit ports 610,690. As illustrated in FIG. 10B after complete axial compression of the made-up joint, the opposing apparatus elements 605,660 abut the gasket axial end surfaces 910,960 and the gasket lips 930,980 have bent outward so that the sealing surfaces 934,984 have come into flat contact with the corresponding fluid delivery apparatus element fluid conduit port face surfaces 614,664. It should be appreciated that the radial extent of the radial outer surface 990 of the gasket 900 is again preferably less than the radial extent of the flat surfaces 630,680 of the opposing apparatus elements, both before and after compression between the opposing apparatus elements 605,660 as shown in FIGS. 10A and 10B.

The various gasket designs described herein are particularly useful in high purity fluid delivery apparatus situations wherein gasket materials may have mechanical properties similar to the apparatus elements intended to be sealingly joined in fluid communication. The use of fluid delivery system components made from high purity 316L stainless steel with fluid conduit ports having flat-bottomed counterbores is well known. The difficulties of achieving molecular level leak tightness with such components can be lessened by using the described designs. In high purity liquid delivery apparatus made from polymer materials there are essentially identical problems and these designs are similarly applicable to those situations too.

As should be appreciated in view of the above disclosure, the various gasket designs described herein permit opposing axial faces of the gasket to be independently tailored to meet the physical and mechanical requirements of the adjacent face surface of the fluid delivery apparatus against which they abut. Thus, for example, the gasket sealing surface on one side of the gasket may be constructed to sealingly engage an annular projection surrounding a circular conduit opening in one apparatus element, while the opposing side of the gasket may be constructed to sealingly engage a recessed flat surface surrounding a circular conduit opening in an opposing apparatus element.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. A ring-shaped gasket for sealingly joining opposed fluid conduit ports, the gasket comprising:
    a gasket body having a radial outer surface, a first axial end surface, and a second axial end surface, the gasket body being pierced through by a hole creating a fluid pathway and defining a radial inner surface;
    wherein the first axial end surface has a stress concentration feature formed in the gasket body to define a lip on the first axial end surface, the lip projecting axially outward beyond the first axial end surface and including a sealing surface adjacent a protective ridge, the lip having a radial undercut formed by the stress concentration feature, a bottom portion of the radial undercut extending radially and axially inward of at least a portion of the lip, the lip being constructed and arranged to plastically deform in response to the sealing surface contacting a face surface of a first fluid conduit port; and
    wherein the second axial end surface has a substantially flat gasket sealing region formed as a circumferential sector generally perpendicular with respect to an axis of the hole and parallel to a plane of the second axial end surface prior to installation of the gasket.

2. The gasket of claim 1, wherein the stress concentration feature comprises a plurality of cavities formed in the first axial end surface, each cavity of the plurality of cavities having a volumetric axis forming an acute angle with a plane of the first axial end surface to form a plurality of radial undercuts.

3. The gasket of claim 1, wherein the stress concentration feature comprises a groove formed in the first axial end surface, a wall of the groove closest the radial inner surface forming an acute angle with a plane of the first axial end surface to form the radial undercut.

4. The gasket of claim 3, wherein an outer periphery of the groove is surrounded by a portion of the first axial end surface that extends axially outward to a lesser extent than the lip prior to installation of the gasket.

5. The gasket of claim 1, wherein the stress concentration feature comprises a U-shaped groove formed in the first axial end surface, substantially parallel walls of the groove forming an acute angle with a plane of the first axial end surface to form the radial undercut.

6. The gasket of claim 5, wherein the gasket comprises a malleable material.

7. The gasket of claim 5, wherein the gasket comprises one of a unitary metallic material substantially identical to 316 stainless steel alloys and a unitary metallic material selected from the group consisting of a stainless steel alloy, a chromium alloy, a nickel alloy, commercially pure nickel, a copper alloy, and commercially pure copper.

8. The gasket of claim 5, wherein an axial extent of the gasket body adjacent the radial inner surface of the gasket is less than the axial extent of the gasket body adjacent the radial outer surface.

9. The gasket of claim 8, wherein the protective ridge is disposed radially outward of the sealing surface.

10. The gasket of claim 9, wherein the gasket body includes a circumferential groove defined in the radial outer surface of the gasket body to accommodate a keeper.

11. The gasket of claim 10, wherein the sealing surface is a circumferential sector exhibiting a generally constant angle with respect to the first axial end surface.

12. The gasket of claim 5, wherein the protective ridge is disposed radially outward of the sealing surface.

13. The gasket of claim 5, wherein the gasket body includes a circumferential groove defined in the radial outer surface of the gasket body to accommodate a keeper.

14. The gasket of claim 5, wherein the sealing surface is a circumferential sector exhibiting a generally constant angle with respect to the first axial end surface.

15. The gasket of claim 1, wherein the protective ridge is disposed radially outward of the sealing surface.

16. The gasket of claim 15, wherein the gasket body includes a circumferential groove defined in the radial outer surface of the gasket body to accommodate a keeper.

17. The gasket of claim 16, wherein the sealing surface is a circumferential sector exhibiting a generally constant angle with respect to the first axial end surface.

18. The gasket of claim 1, wherein the gasket body includes a circumferential groove defined in the radial outer surface of the gasket body to accommodate a keeper.

19. The gasket of claim 1, wherein the sealing surface is a circumferential sector exhibiting a generally constant angle with respect to the first axial end surface.

20. The gasket of claim 1, wherein an axial extent of the gasket body adjacent the radial inner surface of the gasket is less than the axial extent of the gasket body adjacent the radial outer surface.

21. The gasket of claim 1, wherein the substantially flat gasket sealing region is recessed within the second axial end surface.

* * * * *